US 8,660,121 B2

(12) United States Patent
McCormack (10) Patent No.: US 8,660,121 B2
(45) Date of Patent: Feb. 25, 2014

(54) ADVANCED COMMISSIONING OF WIRELESS NETWORK SYSTEMS

(75) Inventor: James Joseph Anthony McCormack, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 137 days.

(21) Appl. No.: 13/377,411

(22) PCT Filed: Jun. 8, 2010

(86) PCT No.: PCT/IB2010/052533
§ 371 (c)(1),
(2), (4) Date: Dec. 9, 2011

(87) PCT Pub. No.: WO2010/143130
PCT Pub. Date: Dec. 16, 2010

(65) Prior Publication Data
US 2012/0082062 A1    Apr. 5, 2012

(30) Foreign Application Priority Data

Jun. 10, 2009 (EP) .................... 09162445
Nov. 13, 2009 (EP) .................... 09175930

(51) Int. Cl.
*H04L 12/28* (2006.01)
(52) U.S. Cl.
USPC .......................... 370/389; 370/254
(58) Field of Classification Search
None
See application file for complete search history.

(56) References Cited

U.S. PATENT DOCUMENTS

2008/0186202 A1    8/2008  Vaswani et al.
2013/0077527 A1*   3/2013  Walley et al. .............. 370/254

FOREIGN PATENT DOCUMENTS

WO    2007040398 A1    4/2007

OTHER PUBLICATIONS

Salowey R. Droms; Cisco Systems, Inc.; "RADIUS Delegated-IPv6-Prefix Attribute; rfc4818.txt" IETF Standard, Internet Engineering Task Force, IETF, CH, Apr. 1, 2007, XP015050666, ISSN: 0000-0003, Chapter 1.

* cited by examiner

Primary Examiner — Kwang B Yao
Assistant Examiner — Tung Q Tran (57) ABSTRACT

A wireless network system and a method of commissioning a wireless network system is described. The network system comprises at least a network device (1) and a joining device (21). The network device (1) comprises a communication interface (2) for transmitting and receiving data over a wireless medium and a first network address of a first network system (30). The joining device (21) comprises a communication interface (2) for transmitting and receiving data over a wireless medium, a second network address of a second network system (35) and a configuration memory (28) for storing at least a network address. The network device (1) and the joining device (21) are configured for operation in a discovery mode, in which said joining device (21) broadcasts a discovery message. Said network device (1) upon reception of said discovery message enters a commissioning mode, in which the network device (1) provides joining information to said joining device (21), comprising at least a third network address of said first network system (30). The joining device (21) accordingly stores said joining information in said configuration memory (28), so that said joining device (21) is addressable in said first network system (30) and said second network system (35).

12 Claims, 6 Drawing Sheets

ADVANCED COMMISSIONING OF WIRELESS NETWORK SYSTEMS

FIELD OF THE INVENTION

The invention relates to a wireless network system and a method of commissioning a wireless network system.

BACKGROUND OF THE INVENTION

Wireless network systems with devices communicating over a wireless medium are today common for a variety of applications. Usually in such network systems, each device being part of the system has a distinguishable network address, so that it is possible to direct messages to a specific device using this address. Each communication thus comprises in addition to the message at least an address, so that the message reaches its desired recipient. For example, in a network having remote control units and multiple controllable appliances, e.g. lighting devices, temperature sensors or heating devices, each of the remote control units needs information on how to address each single appliance to be able to control the appliances individually and in user-defined groups or to process received sensor values appropriately.

To operate a network system, it is thus necessary for each of the network devices to be addressable in the network. A new device, joining the network therefore needs to be configured or commissioned.

Even in case the initial configuration of such a network system is complete, it might be necessary to change the configuration of the network system or to merge devices from multiple network systems for enhanced functionality.

The thus necessary configuration of the network system usually is a tedious task for the user, especially for consumers, which are interested in a comfortable installation and "plug-and-play" behavior of the network components. For example, in case of a network merge, the user usually needs to remove the devices from one of the networks and then add these devices to the respective other network system.

It is therefore an object of the present invention to provide a wireless network system, which allows an easy, convenient and reliable configuration.

SUMMARY OF THE INVENTION

The above-mentioned object is solved by a wireless network system and a corresponding method of commissioning a wireless network system according to claims 1 and 11. The dependent claims relate to preferred embodiments of the invention.

The basic idea of the invention is to provide a wireless network system in which a network device being part of a first network system may communicate with a joining device, being part of a second network system in a discovery mode.

In the discovery mode, the joining device broadcasts a discovery message, which upon reception causes the network device of the first network system to enter a commissioning mode for joining said first network system, so that the joining device after successful commissioning is addressable and thus operable in both network systems.

The present invention thus allows adding a joining device to the first network system, although the joining device is already configured for operation in a second network system, i.e. the joining device is not a "virgin" or unconfigured device. It is thus advantageously not necessary for a user to disconnect the joining device from the second network system, e.g. by conducting a tedious disassociation procedure.

Furthermore, the joining device may be present in more than one network system simultaneously, maintaining the necessary communication parameters and eventual user-defined binding relations, group and group-scene settings without a device reset, which enhances the usability of the wireless network system, enabling an enhanced and convenient plug-and-play behavior.

The wireless network system according to the present aspect of the invention comprises at least a network device and joining device, each having a communication interface for transmitting and receiving data over a wireless medium, which is preferably a shared medium. The communication interface may be of any suitable type, for example an optical communication interface, although preferably, the communication interface is a radio frequency (RF) communication interface, most preferred configured for communication with a standard communication protocol, such as IEEE 802.11 or IEEE 802.15.4.

The network device is configured for operation in the first network system, while the joining device is configured for operation in the second network system, i.e. the devices are configured for communication in different networks, e.g. in a network communications mode for communication with other devices of the respective network.

In the context of the present invention, the term "network system" may refer to a logical network of one or more devices, which are able to communicate with each other using defined network addresses of the respective network. The first and second network system may for example be personal area networks ("PANs"), each having unique network identification information, e.g. a PAN-ID, allowing to reliably and uniquely identify the respective network system at least in its physical vicinity.

According to the invention, the network device is configured with a first network address for communication, i.e. for being addressable in the first network system. The joining device is configured at least with a second network address for being addressable in the second network system.

Certainly and depending on the respective communications protocol used, the devices may be provided with further parameters for network communication in each respective network, such as information relating to network security, for example a security key for an encrypted communication, a channel number, e.g. MAC channel choices, arbitration information for dealing with network-ID collisions or a defined communications mode.

The network address and the eventual further parameters may be hard coded, e.g. factory-set, or programmed in a suitable memory of the respective device. The network address may be of any suitable kind to enable that the device in the respective network system is—in a normal operational state—individually addressable. The format and length of the network address may depend on the specific communications protocol used and, with regard to the length of the network address, i.e. the available address range, certainly on the number of devices in the network. Since it is only needed to address the devices, being part of the network individually, a "network-wide" unique address is preferred.

According to the invention, the joining device further comprises a configuration memory for storing at least a network address. The configuration memory may be of any suitable type, for example a variable memory, such as one or more internal or external RAM or FLASH memory units. Preferably, said second network address and any eventual further parameters of said second network system are stored in said configuration memory of said joining device. Certainly, the network device may also comprise a configuration memory, e.g. for storing said first network address.

The network device and the joining device may comprise further components, such as for example a power supply, e.g. a battery or a mains-connected power supply unit, a processor unit, a user interface or memory. Preferably, the network device and/or the joining device each comprise a central processing unit, adapted at least to send/receive commands over the communication interface and implementing at least part of the behavior of the respective device, for example using a suitable programming, comprised in the memory.

According to the invention, the network device and the joining device are configured to operate at least in a discovery mode, in which the joining device broadcasts a discovery message in the wireless medium. The network device, which receives the discovery message enters a commissioning mode. The discovery message may be of any suitable type, which causes the network device to enter the commissioning mode.

In the commissioning mode, the network device sends "joining information" to the joining device comprising at least a third network address, needed for communication in the first network system, so that the joining device is added to the first network system, also referred to as "joining" the network, "commissioning" the joining device or "association" of the joining device with the first network system. Depending on the communications protocol of the network system, the joining information may comprise further parameters, needed for communication in the first network system. For example, such parameters may comprise information relating to network security, such as a security key for an encrypted communication, a channel number, e.g. MAC channel choices, arbitration information for dealing with network-ID collisions or a defined communications mode, depending on the communications protocol of the network system. In case the network devices comprises and issues at least a security key, the network device may preferably correspond to a trust center. Most preferably, the joining information further comprises the first network address of the network device for a subsequent exchange of directed, i.e. unicast transmissions between the devices.

Once the commissioning is complete, the joining device may preferably be configured to announce its presence in said first network system, e.g. with a network-wide broadcast or an announcement broadcast comprising at least its network address.

Subsequent to the commissioning, the joining device is considered a member of the first network system and both devices are then able to operate and communicate with each other and eventual further devices in said first network system. Additionally, the joining device is addressable in said second network system, i.e. the joining device maintains the second network address and all eventual further communication parameters for the operation in the second network system, allowing a simultaneous operation and membership in both network systems, i.e. a "bridging" of said second network system to the first network system.

It should be noted that in a broad sense, before the commissioning, the devices may be regarded as configured for communication in their respective network system.

The invention certainly is not limited to connecting the joining device with two network systems; it is certainly possible to add the joining device to further network systems using the above mentioned procedure, i.e. three or more network systems, depending on the respective communications protocol used.

The discovery mode may be initiated by a user, for example by press of a corresponding "join mode" or "bridging" button on the joining device, upon which the joining device broadcasts said discovery message.

However, for security reasons it is preferred that the network device is configured to only enter the commissioning mode upon secure initiation of the discovery mode.

According to the present embodiment, the network device only enters the commissioning mode and/or provides joining information in case a security condition is fulfilled. The present embodiment thus advantageously avoids an accidental commissioning of a device, e.g. of a further user, such as a neighbor.

The secure initiation may further provide the user with the possibility of a selection of the devices. This is especially advantageous in large network systems with a multitude of devices in the transmission range, avoiding an unintended network configuration.

Most simply, a secure initiation may be e.g. provided by a corresponding "join mode" button on the network device, which may be activated manually by the user.

Alternatively or additionally it may be possible to provide one of the devices with a secure key, e.g. an identification number (PIN), and the respective other device with a user interface, e.g. a keypad, for user entry of the key. The key entered by the user may then be transferred to the network device, e.g. comprised in said discovery message, so that the network device only enters the commissioning mode in case the user entry corresponds to the stored secure key.

According to a further alternative or additional embodiment, the secure initiation may be based on the detection of the physical proximity of the devices, explained in the following. The detection of the proximity of the devices bears the advantage that the secure initiation may be conducted without any user interaction, further improving the usability of the network system.

The network device according to the present embodiment further comprises a predetermined proximity value. The discovery message, send by said joining device comprises proximity information, corresponding to the distance between the network device and the joining device. The network device, which receives the discovery message, is configured to determine whether said proximity information corresponds to the predetermined proximity value. In case the proximity information corresponds to the proximity value, the network device enters the commissioning mode and sends said joining information to the joining device.

The proximity information may include all information, allowing determining the physical distance between the joining device and the network device. The proximity information may preferably correspond to the signal strength of a communication of the joining device sent to the network device, e.g. the signal strength of the discovery message, thus being inherently comprised in the discovery message.

The predetermined proximity value may be of any suitable kind, allowing comparing the proximity value with the proximity information. For example, the proximity value may be in the format of a threshold value, corresponding to a defined distance, so that the joining device only enters the commissioning mode, in case the proximity information is below said threshold value, i.e. the joining device is closer to the network device than the defined distance.

The predetermined proximity value may be hard-coded in the network device or comprised in a suitable memory, so that it is possible to adapt the proximity value according to the desired application. Preferably, the proximity value is a proximity threshold, corresponding to a distance of less than 2 meters, most preferred less than 0.5 meters, so that the commissioning mode is only entered in case said joining device is closer than the defined proximity threshold to the network device.

As already described above, the communication interfaces of the network device and the joining device may be configured for use in standard network systems. The communication in the discovery mode may therefore correspond to any suitable communication protocol known today according to which a wireless communication may be established. A suitable group of preferred communication protocols for implementing the present invention are usually referred to as ad-hoc wireless network systems.

A particularly suitable and preferred communication protocol for implementing the present invention is Zigbee. Therefore, the communication interfaces are most preferably configured for use in a Zigbee network system. Although the invention is not limited thereto, it is explained in the following referring to Zigbee for illustration purposes.

Zigbee is an open standard and is based on the IEEE 802.15.4 communications protocol, which defines a physical link layer (PHY) and a media access control layer (MAC). Zigbee uses this protocol and defines a network layer (NWK) and an application layer (APL) on top of the MAC-layer, provided by IEEE 802.15.4. A description of Zigbee and the Zigbee protocol stack is disclosed in the Zigbee specification, e.g. in document 1_053474r17ZB, describing "Zigbee 2007", dated Jan. 17, 2008, available from the Zigbee Alliance Inc.

Referring to Zigbee, said network address preferably corresponds to a Zigbee short network address. Said network identification information preferably corresponds to a Zigbee PAN-ID, most preferred to an extended PAN-ID. The term "network system" with reference to Zigbee preferably corresponds to a personal area network (PAN).

Since in the discovery mode, a network communication may not be possible, for example in case the network communication is encrypted, it is preferred that in the discovery mode, the communication interfaces of the network device and the joining device are configured for out-of-network communication. During an out-of-network communication, the devices form a temporary link for direct communication although the devices are configured for operation in different network systems. The devices may thus be considered as forming a temporary network.

According to a preferred embodiment of the invention and referring to Zigbee, the discovery message corresponds to a Zigbee global PAN-ID transmission, as described in the above mentioned Zigbee specification.

Global PAN-ID transmission frames are addressed with a specific and reserved PAN number, e.g. DstPANID=0xFFFF, so that such transmission frames are routed to and may be received by every device in the transmission range. It is thus possible to communicate between devices which do not necessarily have to be in the same Zigbee network, i.e. providing out-of-network communication.

Alternatively or additionally and according to a development of the present aspect of the invention, the discovery message corresponds to a Zigbee Inter-PAN transmission. Zigbee Inter-PAN transmissions are defined in the Zigbee smart energy profile, as disclosed in document 075356r14, dated May 29, 2008, available from the Zigbee Alliance Inc.

Using Zigbee Inter-PAN transmissions it is possible for a network device to exchange information with a further device, which does not necessarily have to be part of the same Zigbee network, in a limited way.

The format of a Zigbee Inter-PAN transmission frame usually does not comprise a network address in the NWK layer, but is addressed with the predefined address, e.g. MAC-address of the desired destination device. The use of Zigbee Inter-PAN transmissions is especially useful since it allows a reliable communication between devices of different Zigbee networks, i.e. the network device and the joining device prior to a complete commissioning, without the need to "open" the Zigbee network, i.e. to temporarily disable the security measures to add the joining device.

Certainly, the further communication in the commissioning mode may also preferably be carried out using Zigbee global PAN-ID and/or Inter-PAN transmissions respectively.

According to a preferred embodiment of the invention, the joining device is an end device. In the context of the present invention, an "end device" is a network device, which has no routing capabilities and which is not necessarily permanently active in the network system. The device may be in a "dormant" or sleep mode for long periods and only activate, when a transmission is required. Its overall power consumption is thus dramatically reduced. According to the present invention, the joining device may thus be an end device in multiple networks, e.g. the first and second network systems simultaneously and may control devices in both networks, e.g. using a "multi-network" group cast.

Preferably, the joining device corresponds to a Zigbee end device and most preferably, the joining device is a reduced function device (RFD), according to Zigbee.

In a preferred embodiment of the invention, the joining device is a mobile device, wherein the term "mobile" is understood to include devices, which are easily transportable by hand, i.e. having an adequate size and weight. Preferably said mobile device is not mains-connected, e.g. having a battery or other suitable power supply.

According to a development of the invention, the joining device is a control device further comprising a user control interface for sending an application control command to and/or receiving an application data value from a further device in the network system. In the context of the present invention the term "user control interface" is understood to comprise any interface for user interaction, like an input interface for the initiation of an application control command to be sent or a display device for display of said application data value. For example, the user control interface may comprise several buttons and/or an LCD-display.

The application control command may be any kind of command for controlling an application device, for example for switching on and off a lighting unit, connected to a device in the network, and is in contrast to a network control command, intended for network configuration or network management purposes. The same applies to the application data value, which may exemplary comprise a sensor reading of a connected sensor.

With reference to wireless networks such as Zigbee, said application control command and application data value refers to a communication on the application layer and may correspond to an application object.

According to the set-up of the present embodiment, the control device advantageously provides the above explained discovery functionality in the discovery mode and furthermore application functionality, i.e. sending application control commands or receiving application data values in a network communication mode. Thus, no further dedicated device is needed in the network system for application control, which advantageously reduces the complexity of the network system and further enhances the operability for a user.

The control device according to the present embodiment may be a computer or a simple wall switch, but preferably is a battery-operated remote control.

According to a development of the invention, the network device is a function device comprising an application interface, configured to receive said application control command and/or to send said application data value to a further device in the network system, e.g. the joining device. The application interface is connectable to an application device, e.g. for performing a controlling, switching or sensor function. The application device may be of any suitable kind, such as a lighting unit, a heating device or any type of electrically controllable device. For example in the case of a connected lighting unit, the application interface may be configured to switch the lighting unit on and off or to dim the lighting unit upon reception of the corresponding application control command. Further, the application interface may alternatively or additionally be configured to send an application data value of a connected application device, for example a temperature reading of a temperature sensor, the reading of a water or electricity meter or an alert of a smoke or fire detector.

Preferably, said function device is integrated with the application device, e.g. with a lighting unit. In the context of a Zigbee network system, the network device may preferably correspond to a full function device (FFD) and/or a router. In case the network device is a router, the joining device may advantageously send messages to other devices of the first network system, which are then routed by the network device.

As discussed above, in said commissioning mode, the joining device is programmed with joining information, comprising at least a network address for operation in the first network system. The joining device is then considered a member of the first network system and may communicate with further devices of the first network system. As discussed above, the joining device also remains in the second network system, i.e. the joining device may also communicate with devices in its "originate" network, i.e. the second network system. In the above embodiment of a control device, the joining device is thus able to control function devices in both networks, e.g. to send application control commands and to receive application data values correspondingly. For example, the user may define lighting scenes for lighting units in both networks, e.g. with a "multi-network" group- or broadcast.

To achieve a simultaneous operation, the joining device may be provided with multiple communication interfaces. Alternatively or additionally, the joining device may be configured to operate the communication interface with the parameters of the respective network in which a communication is presently needed, which provides a "quasi-simultaneous" operation.

The joining information may e.g. be comprised in one or more "joining messages", e.g. a communication of said network device to the joining device, sent during or prior to commissioning. The communication in said commissioning mode may refer to any suitable commissioning or configuration method for providing the joining device with at least a network address according to the respective communications protocol. With reference to Zigbee, the communication in the commissioning mode may correspond to the communication, as described in the Zigbee standard document.

Preferably, the discovery message comprises a predefined address of the joining device. Most preferably, the network device is in the commissioning mode configured to send said joining information to the joining device addressed with said predefined address.

The present embodiment allows a reliable commissioning of the joining device with only a limited number of required transmissions. The predefined address may be any kind of information, allowing individualizing said joining device. For example, the predefined address may be a factory-set address. Preferably, the predefined address is a MAC-address. The predefined address may be hard-coded, e. g. in the communication interface or comprised in a suitable memory, e.g. in the configuration memory.

According to a preferred embodiment, the network device and the joining device are configured for communication in a commissioning mode, in which the network device being configured to broadcast network identification information, said joining device being configured upon reception of said broadcast to send a request to join the network comprising said predefined address to said network device, said network device being configured to respond said request by assigning said third network address to said joining device, to store data corresponding to said network address in a configuration memory and to send joining information comprising at least said third network address to said joining device using said predefined address and said joining device being configured to receive said joining information and to store said joining information in said configuration memory, so that said joining device is addressable in the first network system using said third network address.

The network identification information allows to reliably and uniquely identify the first network system at least in its physical vicinity. Preferably, the network identification information is a unique identifier of the first network system, most preferably a factory-set unique identifier. For example, the network identification information may be a universally unique identifier (UUID) of the network device itself, usually based on the IEEE MAC-address, e.g. a 6-Byte device identifier. The network identification information may be hard-coded in the network device or may be comprised in a variable memory. Preferably, the network identification information is stored in said configuration memory.

As discussed above, the network device assigns the joining device said third network address. The network device may e.g. assign said network address on a random basis. However, to avoid address duplication, the network device may preferably be provided with information, corresponding to an address range, e. g. obtained in a prior commissioning of the network device itself. Such information may e.g. be stored a suitable memory.

In case the network device does not comprise an unallocated address for assignment to the joining device, the network device may be configured to obtain said third address from a second network device in said first network system. The network device may therefore preferably be configured in said discovery mode to send an address request to a second network device. Said second network device, which receives said address request, provides said third network address to the first network device. The first network device may then assign said third network address to the joining device, as explained before.

Certainly, the second network device may preferably send address range information, i.e. multiple network addresses to said first network device, so that the first network device then may commission further devices without sending an address request each time a new joining device needs to be commissioned. Preferably, the address request is a network-wide broadcast in said first network system, so that in case some of the further devices are not active or not in the transmission range, said third address may be received safely. Certainly, dependent on the network configuration, it may happen that no reply is received in response to the address request. In such a case, the network device may most preferably be configured to randomly choose the network address after a defined timeout. An eventual address conflict may then be resolved during operation of the network system.

In case more than one reply is received upon said address request, the network device is preferably configured to use the address of the first reply and assign the address as third network address to the joining device. All further replies then can be ignored.

According to a development of the invention, the joining information comprises multiple addresses, e.g. address range information of said first network system. The present embodiment may be especially advantageous since the joining device, once joined the network, may then commission further devices for operation in the first network system, i.e. the joining device may act as a "commissioning host".

Further advantageous embodiments are mentioned in the dependent claims.

BRIEF DESCRIPTION OF THE DRAWINGS

The above and other objects, features and advantages of the present invention will become apparent from the following description of preferred embodiments, in which.

DETAILED DESCRIPTION OF EMBODIMENTS

Figure 1:
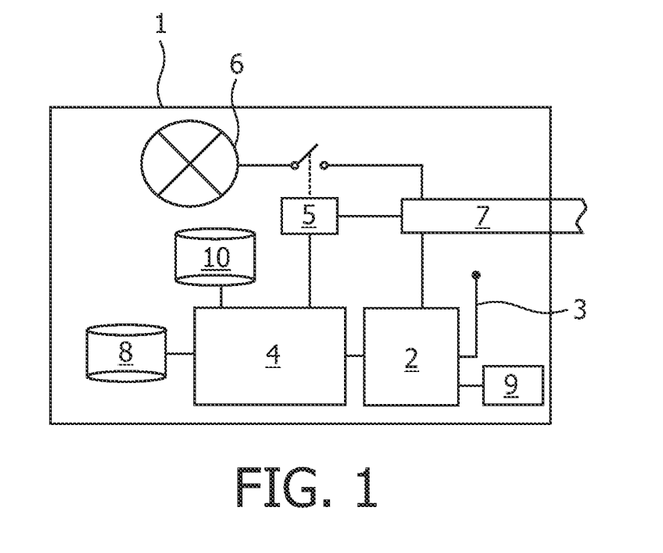
FIG. 1 shows an embodiment of a network device in a schematic view.

FIG. 1 shows a first embodiment of a network device 1, in the present example a lighting unit for room lighting in a schematic representation. The network device 1 comprises a communication interface 2 with a suitable antenna 3, provided for radio-frequency wireless communication according to the Zigbee and IEEE 802.15.4 communication protocols, in the following referred to as 'Zigbee' or Zigbee protocol. IEEE 802.15.4 provides a physical link layer (PHY) and a media access control layer (MAC). Zigbee provides a network layer (NWK) and an application layer (APL) on top of the MAC-layer. A description of Zigbee and the Zigbee protocol stack is disclosed in the Zigbee specification, e.g. in document 1_053474r17ZB, dated Jan. 17, 2008, available from the Zigbee Alliance Inc. As explained in the following, the communication interface 2 further implements the Zigbee Pro stack profile. An explanation of Zigbee Pro and a corresponding communications stack is disclosed in document 074855r05, dated January 2008, available from the Zigbee Alliance Inc.

The communication interface 2 comprises a unique 64-Bit MAC-address for communication on the MAC-layer and is connected to a CPU 4, which controls the communication over the communication interface 2 using, e.g. a microcontroller with a suitable programming. Furthermore, the CPU 4 is connected to an application interface 5, which is arranged to control a lamp 6, i.e. to switch the lamp 6 on and off and to dim the lamp 6. The application interface 5 is controllable over the network upon reception of an application control command from a further device in the network, such as a remote control device. All components of the network device 1 are connected to a power-supply unit 7, having a mains connection (not shown).

Further, a signal strength detector 9 is connected to the communication interface 2 for determining the received signal strength of an incoming communication and to provide the CPU 4 with a received signal strength indication (RSSI) value. A proximity memory 10 is connected to the CPU 4 comprising a signal strength threshold value for comparing with said RSSI value, i.e. a proximity threshold, so that it is possible for the CPU 4 to determine, whether a device, communicating to said network device 1 is in a defined distance. According to the present embodiment, the proximity threshold corresponds to a distance of less than 0.5 meters. A variable configuration memory 8 is provided for storing network addresses and network configuration data.

The network device 1 corresponds to a Zigbee full function device (FFD). The communication interface 2 is configured for routing, i.e. to receive and forward messages; the network device 1 thus further corresponds to a Zigbee router.

Figure 2:
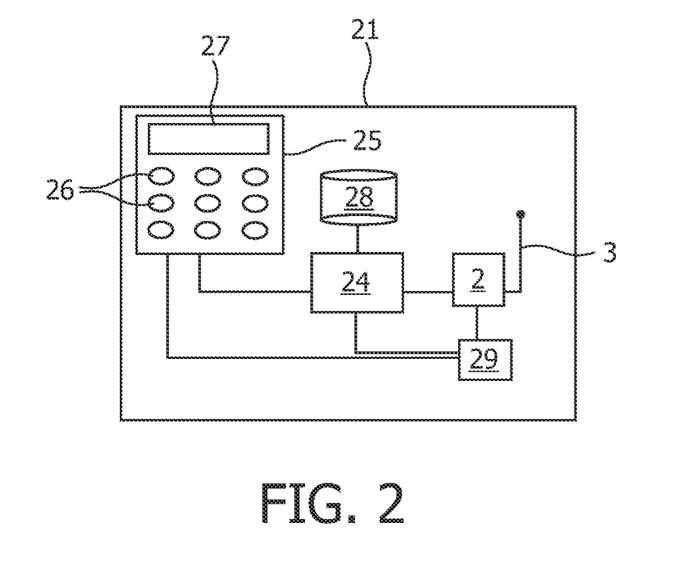
FIG. 2 shows an embodiment of a joining device in a schematic view.

FIG. 2 shows an embodiment of a joining device 21 in a schematic representation. The joining device 21 is a remote control device and comprises, correspondingly to the network device 1, a communication interface 2 with an antenna 3, provided for wireless RF-communication according to Zigbee. The communication interface 2 comprises a unique 64-Bit MAC-address for communication on the MAC layer according to IEEE 802.15.4 and is connected to a CPU 24, which controls the communication. The CPU 24 is connected to a user control interface 25, having buttons 26 and an LCD display 27 for application and network control functions, e.g. to control application interfaces of application devices, such as lighting units, bound to the joining device 21. A variable configuration memory 28 is provided for storing network addresses and network configuration data. A battery 29 supplies all components of the joining device 21 with electrical power. The joining device 21 is a Zigbee end-device, sometimes referred to as reduced functionality device (RFD), and is dormant when no communication is needed, thus saving battery power.

Figure 3:
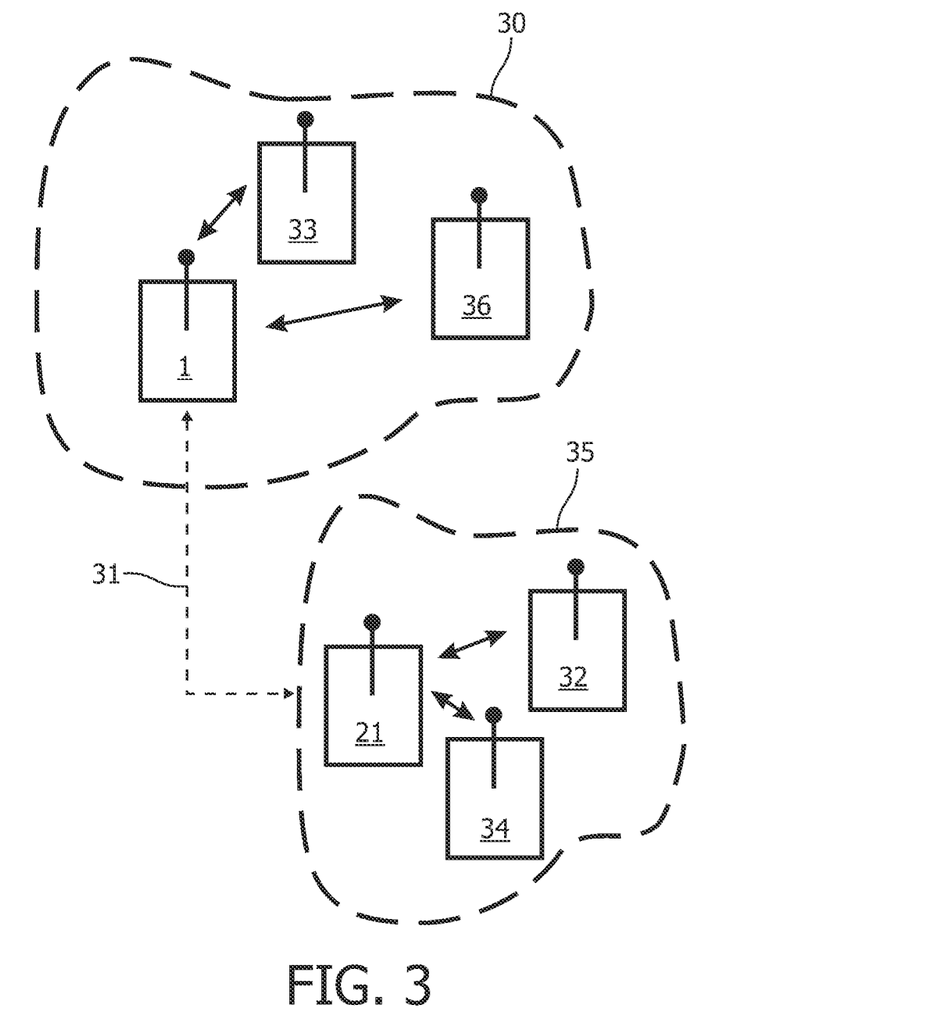
FIG. 3 shows a schematic drawing of an embodiment of wireless network systems.

The network device 1 is configured for operation in a first network system 30 and the joining device 21 is configured for communication in a second network system 35, different from said first network system 30, as shown in FIG. 3. The devices are thus operable in each respective network system 30, 35, which form closed personal area communication networks (PANs) using the Zigbee protocol, providing network functionality, including addressing, medium access, routing capabilities, etc.

In a Zigbee network, each device is uniquely addressable with a short network address, which is a 16-Bit network-wide unique identifier for communication on the network layer (NWK). In terms of the present explanation, the communication in the network and the membership of a device in a network system refers to a communication on the network layer (NWK), e.g. with a Zigbee short network address or a group of addresses in the present personal area network (PAN).

When a network is started or a new device joins the network, it is necessary to commission the network, i.e. to at least assign the device a network address, to be able to communicate in the network system. A corresponding commissioning procedure for the initial configuration of a Zigbee network can e.g. be found in the Zigbee HAP specification, document 053520r25zB_HA_PTG (Home Automation Profile), dated Oct. 25, 2007; available from the Zigbee Alliance Inc.

As discussed above, the network device 1 is configured for operation in the first network system 30 and the joining device 21 is configured for operation in the second network system 35 according to Zigbee. The devices 1, 21 are thus configured for communication in the respective network system, e.g. during a prior commissioning procedure. As indicated by the arrows in FIG. 3, the network device 1 is able to exchange messages with further devices 33, 36 of network system 30, while the joining device 21 is able to exchange messages with the further devices 32, 34. The further devices 32, 33, 34, 36 in the present example may be lighting units or further remote control units.

Accordingly, the configuration memory 8 of the network device 1 comprises network configuration data of the network system 30, e.g. obtained during a prior commissioning of the network device 1. In addition to a short network address, the network configuration data comprises a personal area network identifier (PAN-ID) of the first network system 30.

The PAN-ID provides that the network system 30 is distinguishable from other network systems in its vicinity, i.e. from the second network system 35. Referring to Zigbee, the PAN-ID may be supplemented with an Extended PAN-ID, which usually is a 64-Bit "globally" unique identifier of the respective network system.

The configuration memory 8 of the network device 1 further comprises information corresponding to a channel for network communication and a network key to secure communications.

For example, the network key according to Zigbee HAP is based on AES with a length of 128 Bit. The key may be generated using e.g. a random number generator and/or may be based on the MAC-address of the network device 1 or a further network device of the first network system 30. Additionally, an address range of not occupied addresses for commissioning of new joining devices is comprised in said configuration data. The configuration memory 8 of the network device 1 thus comprises the following network configuration data:

Network Configuration Data of Network Device 1:
PAN-ID (nwk system 30)
Extended PAN-ID (nwk system 30)
Network Key (nwk system 30)
Channel No. (nwk system 30)
Address range: #2-#30 (nwk system 30)
Assigned Device Address:
Short network address #1 (nwk system 30)

Correspondingly to the above, the configuration memory 28 of the joining device 21 comprises the following network configuration data of the second network system 35:

Network Configuration Data of Joining Device 21:
PAN-ID (nwk system 35)
Extended PAN-ID (nwk system 35)
Network Key (nwk system 35)
Channel No. (nwk system 35)
Address range (optional, nwk system 35)
Assigned Device Address:
Short network address #21 (nwk system 35)
Network Devices—Binding Relations:
Short network address #32 (device 32)
Short network address #34 (device 34)

In the following, it is assumed that the user intends to control the lighting unit, i.e. the network device 1 with the (remote control) joining device 21.

Since the devices are configured in the different Zigbee networks (PAN), having differing PAN-IDs and Network Keys, a communication on the network layer addressed with short network addresses is not possible. In the following, the communication in the network and the membership of the device in a network system refers to a communication using a network address, defined on the network layer (NWK), e. g. a Zigbee short network address.

Accordingly, the user would have to remove the joining device 21 explicitly from the network system 35 and join the device with the network system 30, resulting in a loss of all previous user settings, e.g. control binding relationships with devices 32, 34 and group settings.

To avoid such disadvantages and according to the present embodiment, the network device 1 and the joining device 21 are configured for operation in a discovery mode. During the discovery mode, the communication interfaces 2 of the network device 1 and the joining device 21 are driven by the respective CPUs 4 and 24 to communicate in a Zigbee Inter-PAN transmission mode, which allows the network device 1 to exchange information with the joining device 21 although the devices are configured for operation in different Zigbee networks. A Zigbee Inter-PAN transmission may thus be considered as an out-of-network communication channel 31, as shown in FIG. 3.

Zigbee Inter-PAN transmissions are defined in the "Zigbee smart energy profile", as disclosed in document 075356r14, dated May 29, 2008, available from the Zigbee Alliance Inc. Inter-PAN transmission requests are normally handled in the Zigbee stack by a special "Stub" of the application support sub-layer, which performs just enough processing to pass application frames directly to the MAC-layer without involvement of the NWK-layer and to pass received Inter-PAN application frames from the MAC-layer directly to the application.

A first embodiment of the communication in the discovery mode is in the following explained with reference to FIG. 4, which shows a symbolical flowchart thereof. The discovery mode is initiated for the joining device 21 in step 40 upon a user operation, e.g. a button-press of a corresponding "join mode" button 26 on the control interface 25. The network device 1 is configured to be permanently in the discovery mode when configured for network operation, i.e. the device configuration memory 8 is not empty.

Upon activation of the discovery mode, the joining device 21 broadcasts a discovery message, i.e. an Inter-PAN transmission, comprising at least the MAC address of the joining device 21 and requesting to join a network. The discovery message is sent at regular intervals, according to the present example every two seconds.

The network device 1 is in transmission range and receives said discovery message in step 41. The signal strength detector 9 determines the received signal strength (RSSI) of said discovery message and the RSSI value is transferred to the CPU 4, which compares the RSSI value with the signal strength threshold value, polled from the proximity memory 10 in step 42. If the RSSI is higher than or equal to the signal strength threshold, i.e. the joining device 21 is closer than 0.5 meters to the network device 1, the network device 1 enters a commissioning mode according to steps 43-44.

In step 43, the network device 1 assigns the joining device 21 a short network address out of its available address range, i.e. short network address #2, comprised in the configuration memory 8 of the network device 1. Subsequently, the network device 1 in step 44 sends joining information to said joining device 21 in a Zigbee Inter-PAN transmission, addressed with the MAC address of the joining device 21, received in said discovery message in step 41. The joining information comprises the assigned short network address #2, the Extended PAN-ID, the Network Key and the Channel No. of the network system 30. The joining information further comprises address range information for further commissioning of devices by the joining device 21, once the device 21 has joined the network 30 and the short network address #1 of the network device 1 for control of the application interface 5, i.e. for binding to the functionality of the network device 1.

The device configuration memory 28 of the joining device 21 is then, upon reception of the joining information, programmed with the joining information from the network device 1 in step 45, so that the joining device 21 is addressable in the first network system 30. The joining device 21 keeps its configuration data of the second network system 35, so that the joining device 21 after successful commissioning is a member of both network systems 30, 35. The configuration memory 28 of the joining device 21 then comprises the following information:

Network Configuration Data of Joining Device 21:
PAN-ID (nwk system 35)
Extended PAN-ID (nwk system 35)
Network Key (nwk system 35)
Channel No. (nwk system 35)
Address range: (optional nwk system 35)
PAN-ID (nwk system 30)
Extended PAN-ID (nwk system 30)
Network Key (nwk system 30)
Channel No. (nwk system 30)
Address range: #3-#15 (nwk system 30)
Assigned Device Addresses:
Short network address #21 (nwk system 25)
Short network address #2 (nwk system 30)
Network Devices—Binding Relations:
Short network address #32 (device 32)
Short network address #34 (device 34)
Short network address #1 (network device 1)

Figure 6:
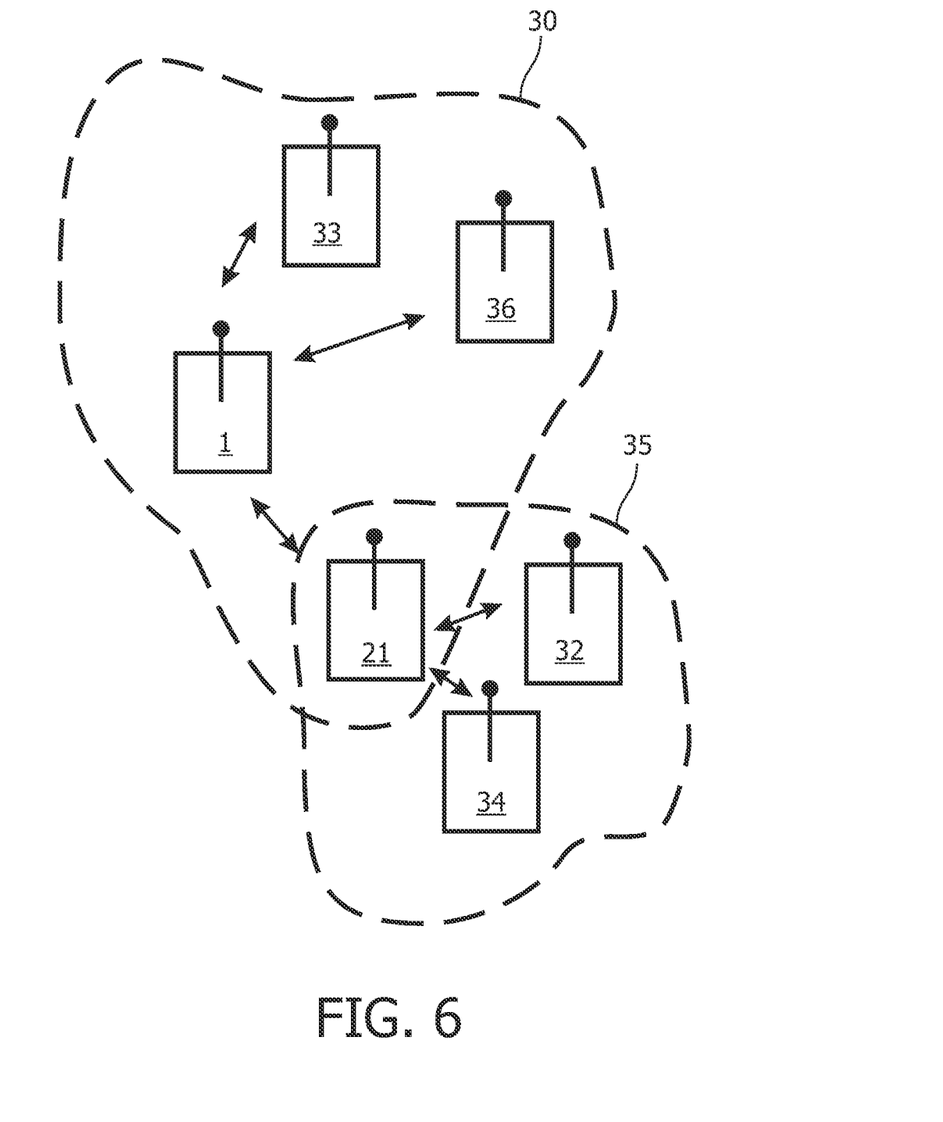
FIG. 6 shows an embodiment of wireless network systems according to FIG. 3 after commissioning and FIG. 7 shows an embodiment of the communication during an address request procedure in a symbolical representation.

The joining device 21 is then considered a member of both networks 30, 35, as shown in FIG. 6 and the method ends. Using the short network address of the network device 1, the lamp 6 is controllable using the user control interface 5 of the joining (control) device 21. A button 26 of the joining device 21 may then be assigned for controlling the specific application interface 5 of the network device 1, which is usually referred to as binding.

Additionally, the joining device 21 is still bound with the further devices 32, 34 of the second network system 35 and may transmit application control commands or receive application data values of the devices 32, 34, respectively. The joining device 21 may for example control the devices 1, 32 and 34 with a corresponding "multi-network" group cast.

After successful commissioning of the joining device 21, the network device 1 marks the short network address #2 as occupied and removes the address and the assigned further addresses from the available address range to avoid address conflicts. The configuration memory 8 of the network device 1 then comprises the following configuration information:

Network Configuration Data of Network Device 1:
PAN-ID (nwk system 30)
Extended PAN-ID (nwk system 30)
Network Key (nwk system 30)
Channel No. (nwk system 30)
Address range: #16-#30 (nwk system 30)
Assigned Device Addresses:
Short network address #1 (nwk system 30)
Short network address #2 assigned to device 21 (nwk system 30, optional)

Figure 5:
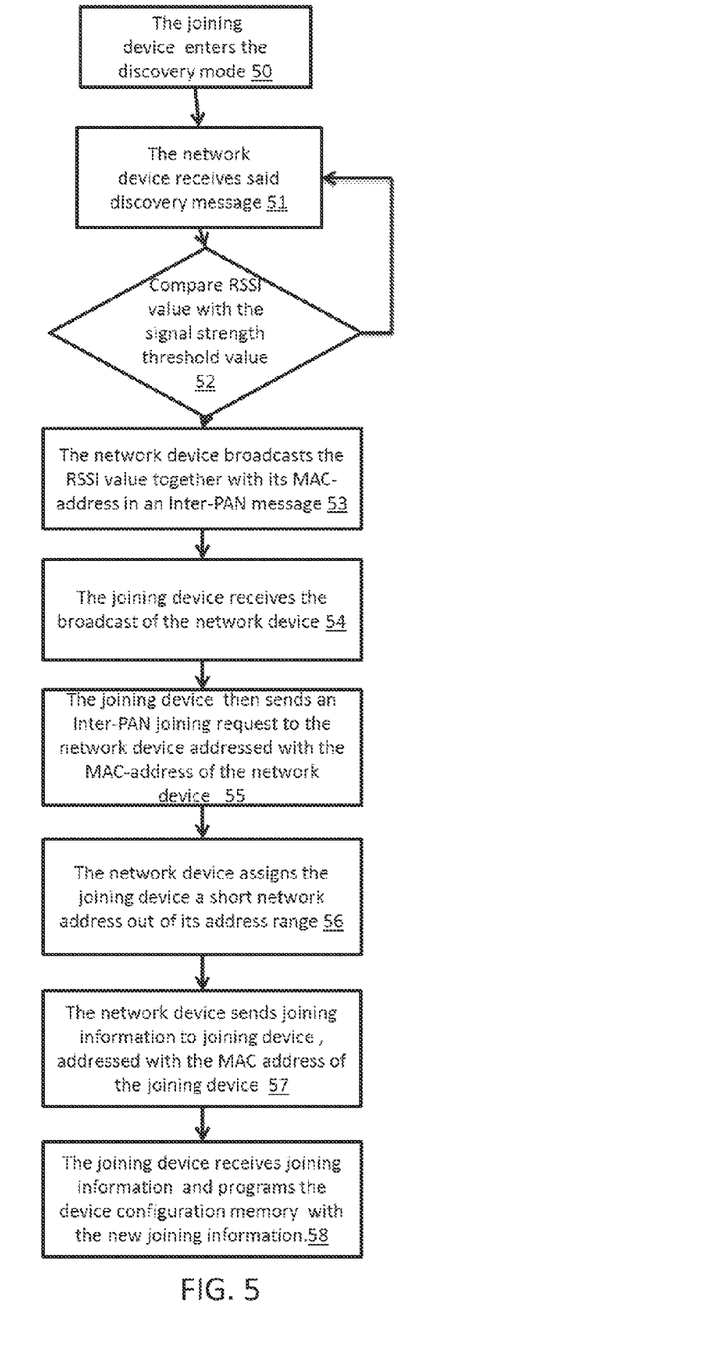
FIG. 5 shows a further embodiment of the communication in the discovery mode in a symbolical flowchart.

A further embodiment of the communication in the discovery mode is shown in a flowchart in FIG. 5. The embodiment of FIG. 5 may be especially advantageous in case more than one device is in physical proximity to the joining device 21, so that it may be necessary to choose a specific device to join with.

As discussed above with reference to FIG. 4, the joining device 21 enters the discovery mode in step 50 by a user interaction and broadcasts the Inter-PAN discovery message. According to the present embodiment, the discovery message does not necessarily comprise the MAC address.

The network device 1 receives said discovery message in step 51 and its signal strength detector 9 determines the received signal strength (RSSI) of said discovery message. The RSSI value is transferred to the CPU 4, which compares the RSSI value with the signal strength threshold value, polled from the proximity memory 10 in step 52. If the RSSI is higher than or equal to the signal strength threshold, i.e. the joining device 21 is closer than 0.5 meters to the network device 1, the network device 1 enters a commissioning mode according to steps 53-57.

In step 53, the network device 1 broadcasts the RSSI value together with its MAC-address in an Inter-PAN message. The joining device 21, receives the broadcast of the network device 1 in step 54 and all eventual further devices, e.g. with reference to FIG. 3 e. g. of the further devices 33, 36 of the first network system 30.

The CPU 24 of the joining device 21 then compares the received RSSI values of all received broadcasts and determines the device, which has sent the highest RSSI value, i.e. the device, which is closest to the joining device 21. With reference to FIG. 3 and assuming that although the further devices 33, 36 are in close proximity to the joining device 21, the network device 1 is the closest, the network device 1 is chosen.

The joining device 21 then sends an Inter-PAN joining request to the network device 1 in step 55, addressed with the MAC-address of the network device 1. The joining request comprises the MAC-address of the joining device 21.

Upon reception of the joining request by the network device 1 in step 56, the network device 1 assigns the joining device 21 a short network address out of its address range, i.e. short network address #2, comprised in the configuration memory 8 of the network device 1.

Subsequently, the network device 1 in step 57 sends joining information to said joining device 21 in a Zigbee Inter-PAN transmission, addressed with the MAC address of the joining device 21, received in said joining request in step 55. The joining information sent corresponds to the embodiment of FIG. 4.

The joining device 21 receives said joining information in step 58 and the CPU 24 of the device then programs the device configuration memory 28 with the new joining information. The joining device 21 is then operable in both network systems 30, 35 and the commissioning ends.

As discussed with reference to FIG. 3, the network device 1 comprises address range information for the commissioning of new joining devices, e.g. the joining device 21. The network device 1 initially receives the address range information during commissioning, i.e. during the prior joining of the network device 1 to the network system 30. However, depending on the number of devices, which join the network 30 by the network device 1 as "commissioning host", the device 1 may run out of assignable addresses. With reference to the embodiments of FIGS. 4 and 5, the network device 1 may thus be additionally configured to obtain additional addresses in an address request procedure in steps 43 and 56 of the embodiments of FIGS. 4 and 5, respectively. The communication in said address request procedure is explained in the following with reference to FIG. 7.

Figure 4:
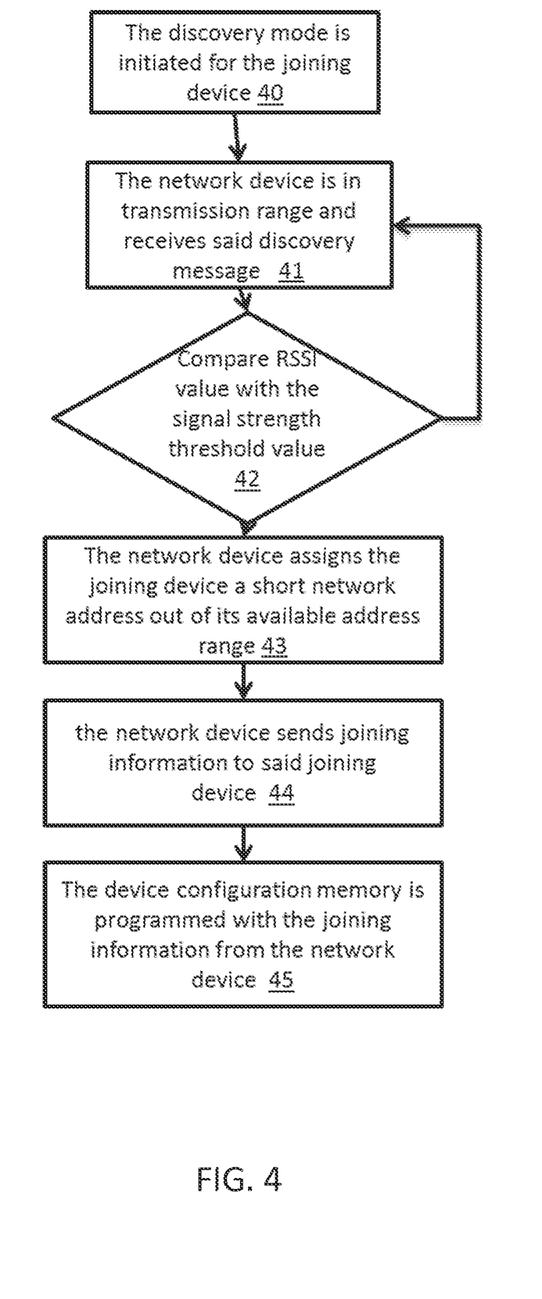
FIG. 4 shows an embodiment of the communication in a discovery mode in a symbolical flowchart.
Figure 7:
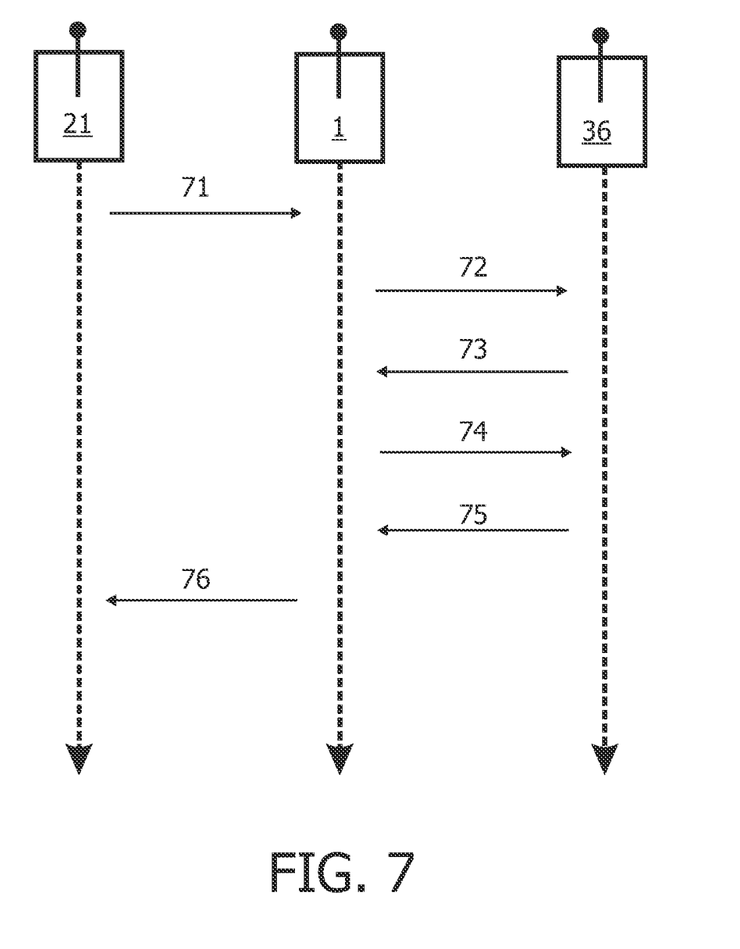

As explained above, the joining device 21 sends a request 71 to join the network 30 to the network device 1 in steps 43 and 56 of the embodiments of FIGS. 4 and 5 respectively. The network device 1 then determines, whether addresses are assignable in its configuration memory 8. If this is not the case, the network device 1 broadcasts an address range request 72 in the network 30. A further device, receiving said request 72, e.g. the device 36, determines, whether assignable addresses are present in its memory. The device 36, in case assignable addresses are present, broadcasts an address-available message 73 comprising the network address of the device 36.

The network device 1, upon reception of message 73, sends a unicast address request 74 to device 36, addressed with the network address of device 36, comprising the network address #1 of the network device 1. The device 36 assigns the network device 1 an address range of its available addresses, marks the address range as occupied and sends address range information 75 in a network unicast communication to the network device 1, addressed with the short network address #1 of the network device 1.

The network device 1 then assigns the joining device 21 a network address and an address range and sends joining information 76 to the joining device 21, as explained above. All further steps and communications of the embodiments of FIGS. 4 and 5 are conducted as discussed above.

The invention has been illustrated and described in detail in the drawings and the foregoing description. Such illustration and description are to be considered illustrative or exemplary and not restrictive; the invention is not limited to the disclosed embodiments.

For example, it is possible to operate the invention in an embodiment, wherein:
- the network communication corresponds to the IEEE 802.11 protocol,
- the joining device 21 is not a remote control device, but a computer or a wall switch,
- the joining information is stored in a further memory of the joining device 21, separately from the network configuration memory 8,
- the network key is stored in a key storage, provided in the network device 1 separate from the network configuration memory 8,
- the communication interface 2 is configured to use a standard Zigbee address allocation method, instead of Zigbee Pro,
- the joining information comprises additional or different information, depending on the communication protocol used,
- the configuration memory 8 of the network device 1 comprises the predetermined proximity value, instead of being comprised in memory 10,
- the network device 1, instead of comprising a lamp 6, comprises an application interface for the connection to a further application device, e. g. with external connection terminals or is connected to an application device, such as a humidity sensor, a fire detector, a smoke detector, a water meter, an electricity meter, a gas meter, a heating device or any other type of appliance,
- referring to the embodiment of FIG. 5 the network device 1 instead of broadcasting its MAC address in step 53, broadcasts the PAN-ID and/or Extended PAN-ID of the network system 30,
- the joining device 21 in step 55 sends its request to join the network, with the PAN-ID and/or Extended PAN-ID of the network system 30,
- the joining device 21 in step 55 broadcasts its request to join the network,
- the MAC-address of the joining device 21 and/or the network device 1 is stored in a suitable memory, instead of being comprised in the communication interface 2,
- with reference to the embodiment of FIG. 5, the joining device 21 instead of being configured to automatically chose a device in step 54, is configured to show a list of all devices in proximity on the display 27, for allowing the user to chose a device for commissioning,
- the joining device 21, instead of being configured for two network systems 30, 35, is configured for operation in three or more network systems and/or
- the joining information does not comprise address range information, in case the joining device 21 is not intended to commission, i.e. to add further devices to the first network system 30.

Furthermore, the communication in the commissioning mode and/or the discovery mode may alternatively or additionally at least partly correspond to Zigbee global PAN-ID transmissions, as defined in document 053474r17, describing "Zigbee 2007" dated Oct. 19, 2007.

Global PAN-ID transmissions, although a transmission on the NWK-layer, are addressed with a special PAN-ID, e.g. DstPANID=0xFFFF, which is routed to and received by every device in range. A global PAN-ID transmission is not encrypted, so that it may be passed to the respective application in a device without further processing or a Network-Key being necessary. A global PAN-ID transmission may therefore with reference to FIG. 3 be considered as an alternative out-of-network communication channel 31.

Other variations to the disclosed embodiments can be understood and effected by those skilled in the art practicing the claimed invention from the drawings, the disclosure and the appended claims.

In the foregoing description and in the appended claims, a reference to the singular is also intended to encompass the plural and vice versa and reference to a specific number of features or devices are not to be construed as limiting the invention to the specific numbers of features or devices. Moreover, expressions such as "include" or "comprise" do not exclude other elements and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium, a magnetic storage medium or a solid-state medium supplied with or as part of other hardware, but may also be distributed in other forms, such as via the Internet or other wired or wireless telecommunication system.

Any reference signs in the claims should not be construed as limiting the scope of the claims.

The invention claimed is:

1. A wireless network system, comprising:
a network device, configured for operation in a first network, comprising:
a communication interface for transmitting and receiving data over a wireless medium, and
a configuration memory comprising first network configuration data enabling the network device to operate in the first network, the first network configuration data comprising a first short address within the first network, using which another device configured for operation in the first network can address the network device in an intra-network communication mode,
a joining device, configured for operation in a second network, comprising
a communication interface for transmitting and receiving data over a wireless medium,
a configuration memory comprising second network configuration data enabling the joining device to operate in the second network, the second network configuration data comprising a second short address within the second network by means of which another device configured for operation in the second network can address the joining device in an intra-network communication mode,
said network device and said joining device being configured for operation in a discovery mode, in which
said joining device broadcasts a discovery message in an inter-network communication mode,
said network device upon reception of said discovery message enters a commissioning mode, in which the network device provides first network configuration data to said joining device in the inter-network communication mode, the first network configuration data comprising at least a third short address within the first network and
said joining device stores said first network configuration data in said configuration memory of the device, so that said joining device is addressable in said first network in the intra-network communication mode, and in addition to being addressable in said second.

2. Wireless network system according to claim 1, wherein said network device further comprises a predetermined proximity value,
said discovery message comprises proximity information, corresponding to the distance between said network device and said joining device and
said network device, upon reception of said discovery message determines, whether said proximity information corresponds to said predetermined proximity value and enters said commissioning mode, in case said proximity information corresponds to said proximity value.

3. Wireless network system according to claim 1, wherein said communication interface of the joining device and of the network device are configured for use in a Zigbee network system.

4. Wireless network system according to claim 1, wherein said communication interface of the device and of the network device in said discovery mode are configured for out-of-network communication.

5. Wireless network system according to claim 1, wherein said joining device is an end device.

6. Wireless network system according to claim 1, wherein said joining device is a control device comprising a user control interface for sending an application control command to and/or receiving an application data value from a further device in network system.

7. Wireless network system according to claim 1, wherein said network device is a function device comprising an application interface, connectable to an application device and configured to receive an application control command from and/or to send an application data value to a further device in the network system.

8. Wireless network system according to claim 1 with a second network device, configured for operation in said first network,
said network device being further configured in said discovery mode to send an address request to said second network device,
to send an address request to said second network device and
said second network device, upon reception of said address request, at least sends said third short address to said network device.

9. Wireless network system according to claim 1, wherein said
joining information comprises multiple network addresses of said first network.

10. A joining device for use in a wireless network system according to claim 1, the joining device being configured for operation in a particular network within the wireless network system, comprising
a communication interface for transmitting and receiving data over a wireless medium and
a configuration memory comprising network configuration data enabling the device to operate in the particular network within the wireless network system, the network configuration data comprising a short address within the particular network by means of which another device configured for operation in the same particular network can address the device in an intra-network communication mode,
said joining device being configured to broadcast a discovery message in an inter-network communication mode and upon reception of another network configuration data of another network device, configured for operation in another network within the wireless network system, comprising at least another short address within the first network, to store said another network configuration data in said configuration memory, so that the joining device is addressable in said another network in the intra-network communication mode, and in addition to being addressable in said particular network system in which the device was originally configured to operate.

11. Method of commissioning a wireless network system, comprising:
comprising:
a first device configured for operation in a first network, the first device comprising:
a communication interface for transmitting and receiving data over a wireless medium, and
a configuration memory comprising first network configuration data enabling the first device to operate in the first network, the first network configuration data comprising a first short address within the first network means of which another device configured for operation in the first network can address the first device in an intra-network communication mode,
and
a second device configured for operation in a second network, the second device comprising:
a communication interface for transmitting and receiving data over a wireless medium, and
a configuration memory comprising second network configuration data enabling the second device to operate in the second network, the second network configuration data comprising a second short address within the second network by means of which another device configured for operation in the second network can address the second device in an intra-network communication mode, in which method:

said second device broadcasts a discovery message in an inter-network communication mode, said first device, upon reception of said discovery message, enters a commissioning mode, in which the first device provides first network configuration data to said second device in the inter-network communication mode, the first network configuration data comprising at least a third short address within the first network, and said second device stores said first network configuration data in its configuration memory, so that said second device is addressable in said first network system in the intra-network communication mode, in addition to being addressable in said second network.

12. A wireless network system, comprising:

a network device comprising a communication interface for transmitting and receiving data over a wireless medium and a first network address of a first network system, and a joining device, comprising
- a communication interface for transmitting and receiving data over a wireless medium,
- a second network address of a second network system and
- a configuration memory for storing at least a second network address, said network device and said joining device being configured for operation in a discovery mode, in which said joining device broadcasts a discovery message, said network device upon reception of said discovery message enters a commissioning mode, in which the network device provides joining information to said joining device, comprising at least a third network address of said first network system and said joining device stores said joining information in said configuration memory, so that said joining device is addressable in said first network system and said second network system, wherein said network device further comprises a predetermined proximity value, said discovery message comprises proximity information, corresponding to the distance between said network device and said joining device and said network device, upon reception of said discovery message determines, whether said proximity information corresponds to said predetermined proximity value and enters said commissioning mode, in case said proximity information corresponds to said proximity value.

* * * * *